No. 742,532.

Patented October 27, 1903.

UNITED STATES PATENT OFFICE.

HERMANN VIETH, OF LUDWIGSHAFEN-ON-THE-RHINE, GERMANY, ASSIGNOR TO THE FIRM OF KNOLL & CO., OF LUDWIGSHAFEN-ON-THE-RHINE, GERMANY.

COTARNIN PHTHALATE AND METHOD OF MAKING SAME.

SPECIFICATION forming part of Letters Patent No. 742,532, dated October 27, 1903.

Application filed June 27, 1903. Serial No. 163,326. (Specimens.)

*To all whom it may concern:*

Be it known that I, HERMANN VIETH, a citizen of the Duchy of Anhalt, and a resident of Ludwigshafen-on-the-Rhine, in the Kingdom of Bavaria, in the German Empire, have invented a new and useful Process for the Manufacture of Phthalic Cotarnin, of which the following is a specification.

Since a number of years the hydrochlorate of cotarnin is used therapeutically as a styptic. As it seemed to me that the acid component of the cotarnin salt may be of influence on the styptic effect, I have prepared a series of new cotarnin salts the pharmacological and clinical examination of which has shown that especially the phthalate of cotarnin is extraordinarily well suited as a styptic by the reason that the phthalic acid itself has anti-irritating and styptic properties. In consequence of this combined effect, superior to the other cotarnin salts, already an infinitesimal quantity of the new salt is sufficient to stop capillary hemorrhage—*e. g.*, after squeezing acne knots or furuncles. The styptic effect was not less sure in menorrhagia after internal administration. Here, too, the effect was quicker and the doses required were smaller than with the other cotarnin salts. The phthalic acid forms two salts with cotarnin—*i. e.*, a neutral and an acid salt. These salts are not known up till now and are formed according to the known methods of forming salts in the organic chemistry—for instance, by the direct combination of cotarnin with the mono or poly equivalent quantity of phthalic acid in the presence or absence of a solvent or by the conversion of cotarnin salt by means of phthalate.

Example: Two hundred and thirty-seven grams of cotarnin base are thoroughly mixed with eighty-three grams of phthalic acid and stirred with a small quantity of a suitable solvent, as water and methyl alcohol. The pasty mass quickly liquefies, forming a solution of neutral phthalate of cotarnin. If the solvent is driven off, preferably *in vacuo*, the salt is obtained as the residuum. Fusion-point, about 102° to 103° centigrade.

Example: Three hundred grams of hydrochlorate of cotarnin are stirred together with two hundred grams of acid phthalate of sodium and five hundred grams of alcohol. The conversion taking place already when cold is preferably assisted by heating the mass for a short time in the water-bath. The alcoholic solution is soon filled while cooling with the well-formed crystals of acid phthalate of cotarnin. The acid phthalate of cotarnin can easily be recrystallized from various solvents and forms light-yellow crystals of a fusion-point of about 115° centigrade. The neutral salt may also be produced by combining the acid phthalate of cotarnin with one molecule of phthalic acid. The neutral salt decomposes into acid salt and free base if recrystallized, for instance, from alcohol. The neutral salt is much more easily soluble in many solvents—for instance, in water—than the acid salt. The acid salt is soluble in about fifty parts of water, the neutral salt in less than one part at ordinary temperature. The fusion-points of both salts are dependent on the mode of heating. They are not constant, as the salts, especially the neutral salt, slowly decompose on heating.

What I claim as my invention is—

1. The process of manufacturing the phthalates of cotarnin which consists in reacting on cotarnin with phthalic acid according to the known methods of forming organic salts, substantially as set forth.

2. As a new article of manufacture and a new medicinal compound the neutral phthalate of cotarnin consisting in a yellowish microcrystalline powder, fusing inconstantly at about 102° to 105° centigrade and decomposing easily when being recrystallized into acid salt and free cotarnin.

In witness whereof I have hereunto set my hand in presence of two witnesses.

HERMANN VIETH.

Witnesses:
OSWALD KRUG,
JACOB ADRIAN.